(12) United States Patent
Sugiyasu et al.

(10) Patent No.: US 9,676,235 B2
(45) Date of Patent: Jun. 13, 2017

(54) TIRE

(75) Inventors: Shinpei Sugiyasu, Kodaira (JP);
Takamitsu Nakamura, Higashiyamato (JP)

(73) Assignee: BRIDGESTONE CORPORATION, Chuo-Ku, Tokyo (JP)

( * ) Notice: Subject to any disclaimer, the term of this patent is extended or adjusted under 35 U.S.C. 154(b) by 970 days.

(21) Appl. No.: 13/985,512

(22) PCT Filed: Feb. 13, 2012

(86) PCT No.: PCT/JP2012/053225
§ 371 (c)(1),
(2), (4) Date: Aug. 14, 2013

(87) PCT Pub. No.: WO2012/111589
PCT Pub. Date: Aug. 23, 2012

(65) Prior Publication Data
US 2013/0312888 A1 Nov. 28, 2013

(30) Foreign Application Priority Data

Feb. 17, 2011 (JP) .................................. 2011-031664
Jun. 8, 2011 (JP) .................................. 2011-128279

(51) Int. Cl.
*B60C 11/03* (2006.01)
*B60C 11/113* (2006.01)
(Continued)

(52) U.S. Cl.
CPC ...... *B60C 11/0304* (2013.04); *B60C 11/0309* (2013.04); *B60C 11/0306* (2013.04);
(Continued)

(58) Field of Classification Search
CPC ............. B60C 11/0304; B60C 11/1353; B60C 11/1369; B60C 2011/0355; B60C 2011/1361; B60C 2011/0353
(Continued)

(56) References Cited

U.S. PATENT DOCUMENTS 6,003,574 A * 12/1999 Boiocchi ................. B60C 11/03
152/209.1
6,213,180 B1 * 4/2001 Himuro ............... B60C 11/0302
152/209.15
(Continued)

FOREIGN PATENT DOCUMENTS

EP 0 565 270 A1 10/1993
EP 2 535 207 A1 12/2012
(Continued)

OTHER PUBLICATIONS

Machine Translation: JP 06227213 A; Yokoyama, Hideki; no date.*
(Continued)

*Primary Examiner* — Steven D Maki
*Assistant Examiner* — Kendra Ly
(74) *Attorney, Agent, or Firm* — Sughrue Mion, PLLC

(57) ABSTRACT

A tire 1 according to the present invention comprises: a circumferential groove 12 formed in a tread portion; a land portion 22 divided by the circumferential groove 12; and transverse grooves formed in the land portion. The transverse grooves comprise a first transverse groove 32 dividing the land portion into several blocks, and a second transverse groove 51 dividing a block 42 divided by the first transverse groove into a first block portion 61 and a second block portion 62. A groove depth of the circumferential groove contacting the second block is smaller than the groove depth of the circumferential groove contacting the first block.

4 Claims, 5 Drawing Sheets

(51) Int. Cl.
*B60C 11/13* (2006.01)
*B60C 11/04* (2006.01)

(52) U.S. Cl.
CPC ......... *B60C 11/047* (2013.04); *B60C 11/1323* (2013.04); *B60C 11/1353* (2013.04); *B60C 11/1369* (2013.04); *B60C 2011/0341* (2013.04); *B60C 2011/0346* (2013.04); *B60C 2011/0353* (2013.04); *B60C 2011/0355* (2013.04); *B60C 2011/0358* (2013.04); *B60C 2011/0374* (2013.04); *B60C 2011/0381* (2013.04); *B60C 2011/1338* (2013.04); *B60C 2011/1361* (2013.04)

(58) Field of Classification Search
USPC .............. D12/505–532; 152/209.22, 209.19, 152/209.21
See application file for complete search history.

(56) References Cited

U.S. PATENT DOCUMENTS

| | | | | |
|---|---|---|---|---|
| D630,574 | S | * | 1/2011 | Nakamura ................... D12/514 |
| 2002/0112801 | A1 | | 8/2002 | Matsumoto |
| 2005/0076985 | A1 | * | 4/2005 | Colombo ............ B60C 11/0302 152/209.18 |
| 2008/0142133 | A1 | | 6/2008 | Ochi |

FOREIGN PATENT DOCUMENTS

| | | | | |
|---|---|---|---|---|
| JP | 61050804 | A | * | 3/1986 |
| JP | EP 0565270 | A1 | * | 10/1993 ......... B60C 11/0302 |
| JP | 06227213 | A | * | 8/1994 |
| JP | 2002-187411 | A | | 7/2002 |
| JP | 2005-088670 | A | | 4/2005 |
| JP | 2005088670 | A | * | 4/2005 |
| JP | EP 1792754 | A1 | * | 6/2007 ............. B60C 11/13 |
| JP | 2008-149995 | A | | 7/2008 |
| WO | 2006/033383 | A1 | | 3/2006 |

OTHER PUBLICATIONS

Machine Translation: JP 2005088670 A; Ohashi, Shiro; no date.*
International Search Report of PCT/JP2012/053225 dated May 15, 2012.
Extended European Search Report, dated Sep. 26, 2014, issued in counterpart European Patent Application No. 12747477.3.
Japanese Official Action Letter, dated Oct. 15, 2014, issued in counterpart Japanese Patent Application No. 2012-557940.

* cited by examiner

TIRE

CROSS REFERENCE TO RELATED APPLICATIONS

This is a National Stage of International Application No. PCT/JP2012/053225 filed Feb. 13, 2012, claiming priorities based on Japanese Patent Application Nos. 2011-031664 filed Feb. 17, 2011 and 2011-128279 filed Jun. 8, 2011, the contents of all of which are incorporated herein by reference in their entirety.

TECHNICAL FIELD

The present invention relates to a tire to be mounted on a vehicle, and in particular to a tire comprising a tread portion having a circumferential groove extending in a tire circumferential direction, a plurality of transverse grooves extending in a tread width direction, which form an asymmetric pattern around a tire equator line.

BACKGROUND ART

Patent Literature 1 describes a tire having a tread portion provided with a circumferential groove extending along a tire circumferential direction and a side land portion and a middle land portion which are divided by the circumferential groove and adjacent to each other in a tread width direction. The side land portion and middle land portion comprise a first transverse groove and a second transverse groove that extend across each land portion. The side land portion and middle land portion are divided into a plurality of side blocks and middle blocks along a tire circumferential direction by the first transverse groove and second transverse groove, respectively. A groove in a tire circumferential direction is located between a sidewall portion of the side block including a trailing ground end of the side block at forward rotation of a tire and an opposite sidewall portion of the middle block. The groove in a tire circumferential direction comprises a raised portion connecting these sidewall portions.

According to this tire, it is possible to increase the stiffness of a sidewall portion including a trailing ground end of a side block, suppress deformation in a tire circumferential direction, and suppress partial wear. Further, as a raised portion is formed in a circumferential groove, not in a transverse groove across each block, drainage can be ensured by a transverse groove portion even when wear of a tread portion proceeds, thereby exposing a raised portion to a ground contact surface.

CITATION LIST

Patent Literature

Patent Literature 1: Japanese Patent Application Publication No. 2005-88670

SUMMARY OF INVENTION

In recent years, in order to cope with a lateral force in critical cornering, a land portion disposed at an outer side of a vehicle when mounting is configured larger than a land portion disposed at an inner side of a vehicle, thereby increasing the stiffness of a vehicle outside subjected to a strong lateral force when cornering. However, in order to ensure drainage, a land portion comprises a lateral direction groove extending in a tread width direction, and a land portion may be divided into several blocks by the lateral direction groove. When a land portion is divided into several blocks, the stiffness of a land portion decreases, and particularly, a land portion disposed at an outer side of a vehicle subjected to a strong lateral force may be deformed so as to collapse into a circumferential direction groove. Driving stability may be decreased by the deformation.

The present invention has been made to solve the above problem. Accordingly, it is an exemplary object of the present invention to provide a tire that suppresses a decrease in driving stability while ensuring drainage by a transverse groove formed in a land portion.

In order to solve the aforementioned problem, a tire (tire 1) as one exemplary aspect the present invention comprises: a tread portion (tread portion 2) which comprises a ground contact surface (ground contact surface 2a) to contact a road surface, and an asymmetric pattern around a tire equator line (tire equator line CL); a circumferential groove (outer circumferential groove 12) which is formed in the tread portion, and extends in a tire circumferential direction; a land portion (outer second rib 22) which is divided by the circumferential groove, and extends in the tire circumferential direction; and a plurality of transverse grooves which are formed in the land portion, communicate with the circumferential groove, and extend in a tread width direction. The circumferential groove is located in an outer area that is an area outside of the tire equator line in a state that the tire is mounted on a vehicle. The transverse grooves comprise a first transverse groove (outer second first transverse groove 32) that divides the land portion into several blocks (outer second block 42), and a second transverse groove (second transverse groove 51) that divides a block divided by the first transverse groove into a first block portion (first block portion 61) and a second block portion (second block portion 62). An area of a ground contact surface of the first block portion is configured to be larger than an area of a ground contact surface of the second block portion. The circumferential groove comprises a first area A1 contacting the first block portion, and a second area A2 contacting the second block portion. In a length of the circumferential groove in a tire circumferential direction, a length L2 of the second area is configured to be larger than a length L1 of the first area. A groove depth from a ground contact surface to a groove bottom surface of the circumferential groove varies along a tire circumferential direction, and a groove depth D2 of at least a part of the second area is smaller than the groove depth D1 of the first area.

BRIEF DESCRIPTION OF THE DRAWINGS

FIG. 3(a) is a cross-sectional view taken along a line A-A shown in FIG. 1. FIG. 3(b) is a cross-sectional view taken along a line B-B shown in FIG. 1.

DESCRIPTION OF THE EMBODIMENT

Figure 1:
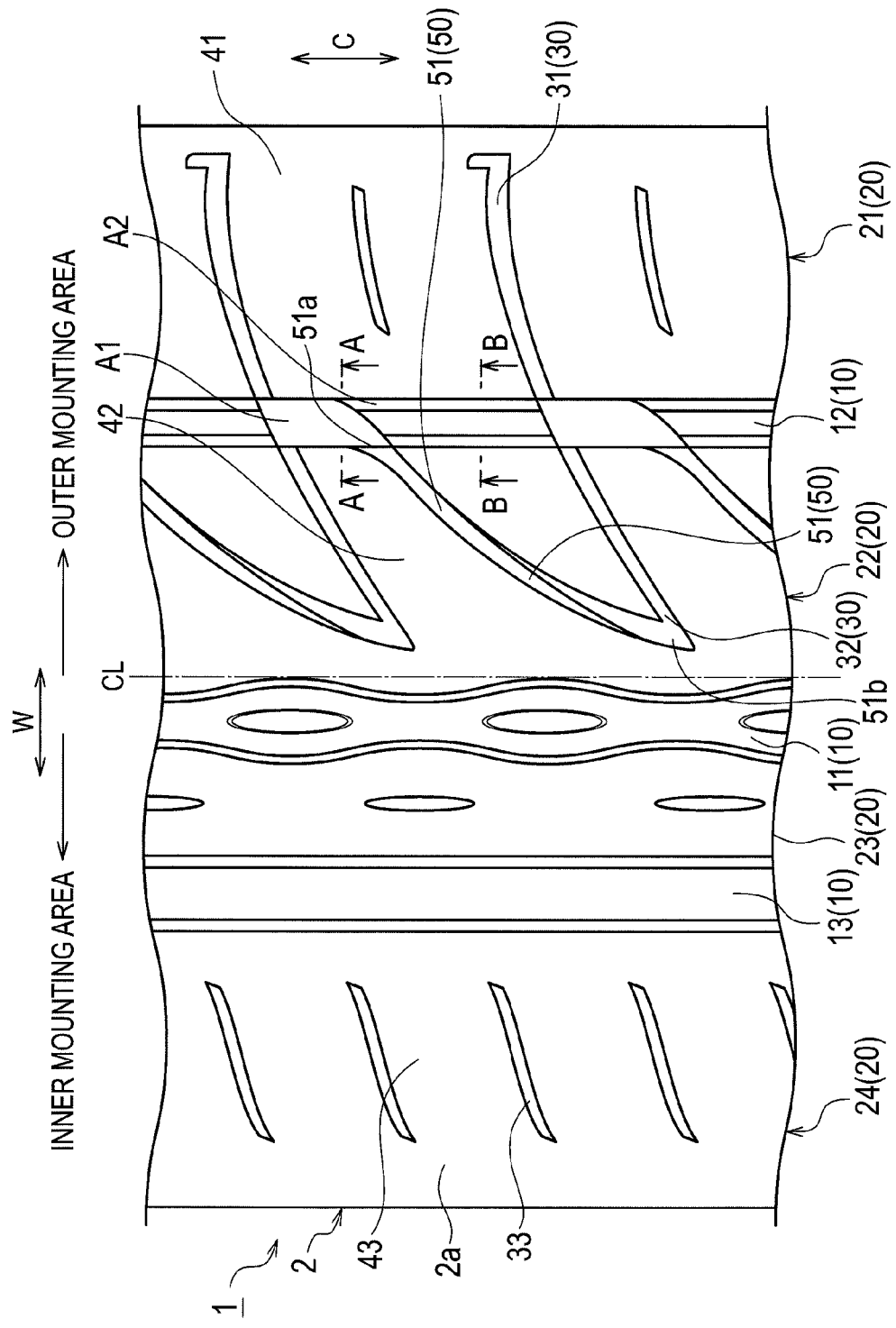
FIG. 1 is a development view of a tread pattern provided on a tread portion of a tire according to an embodiment of the present invention.

Subsequently, an embodiment of a tire according to the present invention will be described with reference to drawings. In the following description of the drawings, the same or similar reference numerals are used to designate the same or similar parts. It will be appreciated that the drawings are schematically shown and the ratio and the like of each dimension are different from the real ones.

Therefore, a specific dimension should be determined in view of the following description. Moreover, among the drawings, the respective dimensional relations or ratios may differ.

Figure 2:
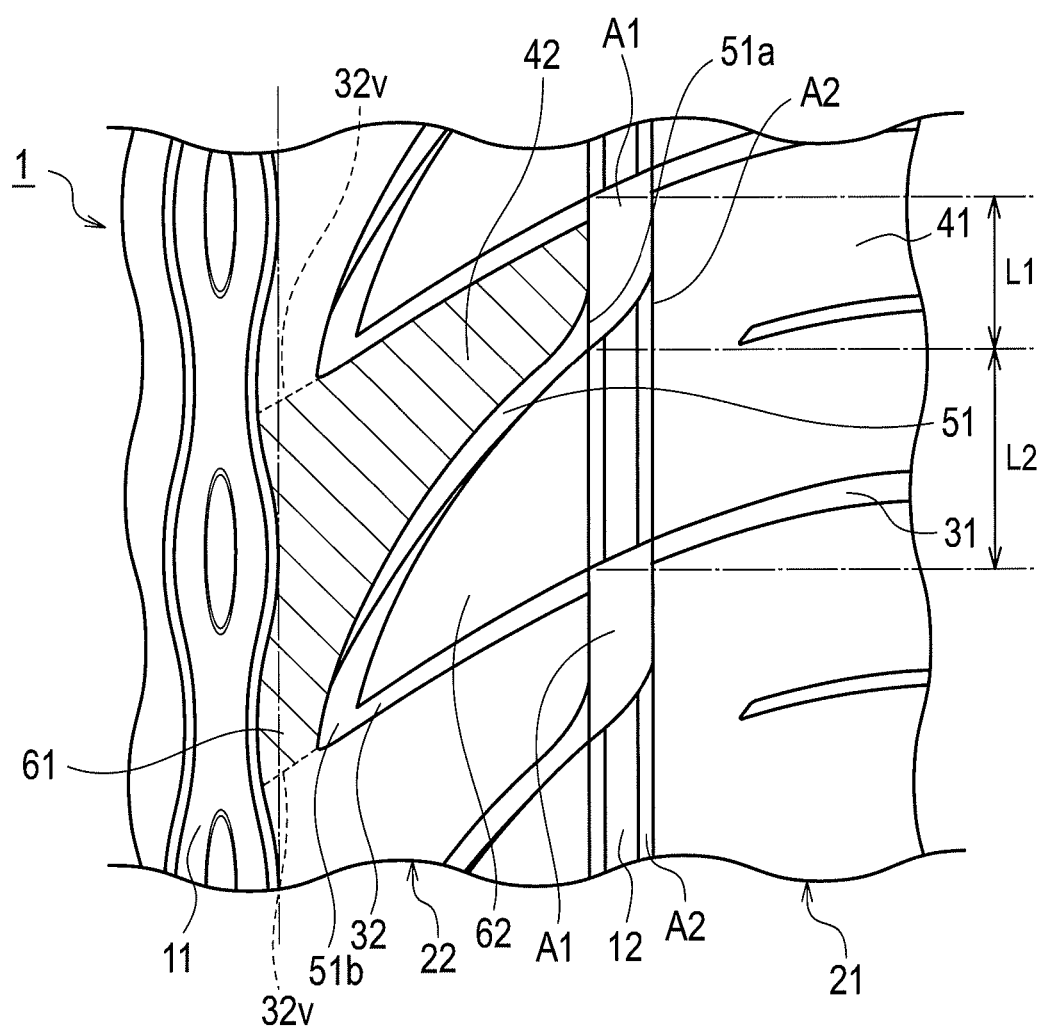
FIG. 2 is a magnified development view of an outer second block portion shown in FIG. 1.
Figure 3:
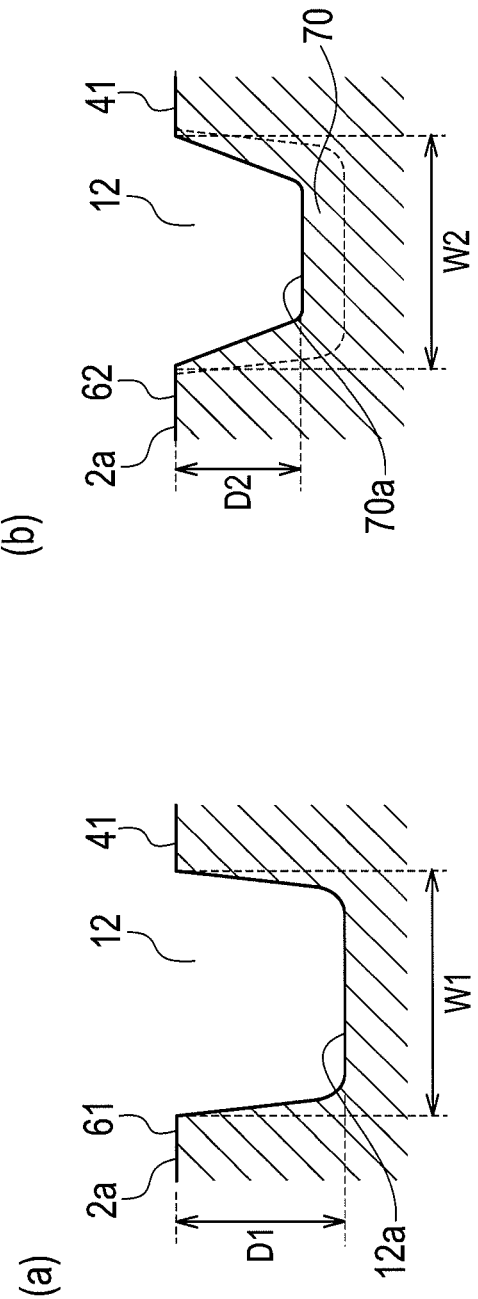
FIG. 3 is a cross-sectional view of FIG. 1.

FIG. 1 is a development view of a tread portion constituting a tire 1 according to a first embodiment of the present invention. FIG. 2 is a magnified development view of an outer second rib 22 of the tire 1 according to the embodiment of the present invention. FIG. 3(a) is a cross-sectional view taken along a line A-A shown in FIG. 1. FIG. 3(b) is a cross-sectional view taken along a line B-B shown in FIG. 1.

The tire 1 comprises a pair of beads 6, a pair of sidewalls 3, a tread portion 2, a carcass 5, a belt layer 9, and a reinforcement layer 7.

The tire 1 comprises, in the tread portion 2, a plurality of circumferential grooves 10 extending along a tire circumferential direction C and a plurality of land portions 20 divided by a circumferential groove 10, as shown in FIG. 1. The tire 1 comprises the tread portion 2 having a ground contact surface 2a that contacts a road surface during running. A mounting position of the tire 1 in a vehicle when mounting on a vehicle is predetermined. In the tire 1, with respect to a tire equator line CL along a tire circumferential direction C and passing through the center of a tread width direction W, the right side shown in the drawing is an outer mounting area located at an outer side of, and the left side is an inner mounting area located at an inner side of a vehicle. The tread portion 2 has a plurality of circumferential grooves 10 extending along the tire circumferential direction C, and a plurality of land portions 20 divided by a circumferential groove 10, as shown in FIG. 1.

The circumferential groove 10 comprises a central circumferential groove 11 provided on a side of the tire equator line CL, an outer circumferential groove 12 located in an outer mounting area, and an inner circumferential groove 13 located in an inner mounting area. Therefore, the outer circumferential groove 12 is located in the outer mounting area outside of the tire equator line in a state that the tire 1 has been mounted on a vehicle. A land portion 20 comprises an outer shoulder rib 21 and an outer second rib 22 that are located in the outer mounting area, and an inner second rib 23 and an inner shoulder rib 24 located in the inner mounting area. The circumferential groove 10 divides a plurality of land portions, and extends along a tire circumferential direction C between the land portions 20.

The outer shoulder rib 21 and inner shoulder rib 24 are provided in a tread shoulder portion. A tread shoulder portion is located between a sidewall and the tread portion 2 contacting a road surface, on the surface of the tire 1.

The outer second rib 22 and inner second rib 23 are adjacent to the outer shoulder rib 21 and the inner should rib 24, respectively, and located closer to the tire equator line than each shoulder rib. In particular, the outer second rib 22 is located adjacent to the outer shoulder rib 21 in the outer mounting area via the outer circumferential groove 12. The inner second rib 23 is located adjacent to the shoulder rib 24 via the inner circumferential groove 13 in the inner mounting area.

The outer shoulder rib 21, the inner shoulder rib 24, and the outer second rib 22 comprise a transverse groove extending in the tread width direction W. The transverse groove comprises a first transverse groove 30 that divides each rib into several blocks along the tire circumferential direction C, and a second transverse groove 50 that divides a block divided by the first transverse groove 30 into two or more areas.

In particular, the outer shoulder rib 21 comprises an outer shoulder first transverse groove 31 that traverses the outer shoulder rib 21. The first transverse groove 31 communicates with the outer circumferential groove 12. In other words, an inner end of the first transverse groove 31 in a tread width direction opens to the outer circumferential groove 12. An outer end of the first transverse groove 31 in a tread width direction is located inside of the outer shoulder rib 21. In other words, an outer end of the first transverse groove 31 in a tread width direction does not open to outside of the tread portion 2 in a tread width direction. In other words, an outer end of the first transverse groove 31 in a tread width direction terminates inside the outer shoulder rib 21. The outer second rib 22 adjacent to the outer shoulder rib 21 comprises an outer second first transverse groove 32 that communicates with the outer circumferential groove 12, and extends toward a tire equator line. The outer second first transverse groove 32 does not communicate with the central circumferential groove 11. In other words, an inner end of the outer second first transverse groove 32 in a tread width direction is located inside of the outer second rib 22. The outer shoulder first transverse groove 31 and the outer second first transverse groove 32 are continuously disposed in a plan view of the tread portion 2 (refer to FIG. 1 and FIG. 2, for example). In other words, in a tread surface view, a direction in which the outer shoulder first transverse groove 31 extends inwardly in a tread width direction coincides with a direction in which the outer second first transverse groove 32 extends outwardly in a tread width direction. Further, the inner shoulder rib 24 comprises an inner shoulder first transverse groove 33 extending in the tread width direction W.

Each rib is divided into several blocks along the tire circumferential direction C by the first transverse groove 30. In other words, several blocks are formed which are adjacent to one another in the tire circumferential direction C via the first transverse groove. In particular, the outer shoulder rib 21 comprises an outer shoulder block 41 divided by the outer shoulder first transverse groove 31, and the outer second rib 22 comprises an outer second block 42 divided by the outer second first transverse groove 32. Further, the inner shoulder rib 24 comprises an inner shoulder block 43 divided by the inner shoulder first transverse groove 33.

The outer second block 42 of the outer second rib 22 comprises a second transverse groove 51 that divides the outer second block 42. The second transverse groove 51 communicates with the outer circumferential groove 12, and extends from the outer circumferential groove 12 toward the tire equator line CL. The second transverse groove 51 inclines to the tread width direction W, and an angle with respect to the tread width direction W is larger than that of the outer second first transverse groove 32. One end 51a of the second transverse groove 51 in the tread width direction W communicates with the outer circumferential groove 12, and the other end 51b communicates with the outer second first transverse groove 32. The second transverse groove divides the outer second block 42 into a first block portion 61 adjacent to the central circumferential groove 11, and a second block portion 62 that is not adjacent to the central circumferential groove 11, and is located outside of the first block 61 in a tread width direction.

FIG. 2 is a magnified development view of a tread portion showing a magnified outer second rib 22 of a tread portion 2. A hatched area in the drawing is a first block portion 61. The outer second block 42 is divided by the outer second first transverse grooves 32 adjacent to each other in the tire circumferential direction C, extended lines 32V of the outer second first transverse grooves 32, the central circumferential groove 11, and the outer circumferential groove 12. The second block portion 62 is divided by the outer second first transverse groove 32, the second transverse groove 51, and the outer circumferential groove 12. In the outer second block 42, a part except the second block portion 62 is a first block portion 61.

The area of the first block portion 61 of the ground contact surface 2a is larger than the area of the second block portion 62. Both of the first block portion 61 and second block portion 62 are adjacent to the outer circumferential groove 12. The outer circumferential groove 12 comprises a first area A1 adjacent to the first block portion 61, and a second area A2 adjacent to the second block portion 62. In the tire circumferential direction C, the length of the second area A2 is larger than the length of the first area A1. More specifically, the length L2 of the second area adjacent to the second block portion 62 is larger than the length L1 of the first area A1 adjacent to the first block portion 61.

The second block portion 62 is spaced from each other in the tire circumferential direction C, and its area is smaller than that of the first block portion 61, and the its length contacting the outer circumferential groove 12 is larger than that of the first block portion. Thus, the stiffness of the second block portion 62 is lower than that of the first block portion 61. Therefore, when a strong lateral force is applied when critical cornering, etc., the amount of collapsing deformation of the second block portion 62 is greater than that of the first block portion 61. To prevent such deformation of the first block portion 61, the groove depth of the outer circumferential groove 12 is different in the first area A1 and second area A2.

In particular, as shown in FIG. 3(b), a raised portion 70 is formed in the second area A2. The raised portion 70 is a protrusion projecting from the groove bottom surface of the outer circumferential groove 12 to outwardly in a tire radial direction. The surface 70a of the raised portion 70 is, in the tire radial direction, located between the ground contact surface 2a and the groove bottom surface (hereinafter, the deepest bottom surface) 12a, of which the groove depth is largest in the outer circumferential groove 12. In the part where the raised portion 70 is formed, the surface of the raised portion is a groove bottom surface. Therefore, the groove bottom surface of the outer circumferential groove adjacent to the second block portion is outside of the groove bottom surface of the outer circumferential groove adjacent to the first block portion in the tire radial direction.

The groove depth D2 of the outer circumferential groove adjacent to the second block portion 62 is smaller than the groove depth D1 of the outer circumferential groove adjacent to the first block portion 61. In the embodiment, the groove depth D2 is set in a range of 60% to 90% with respect to the groove depth D1. The groove width W2 of the second area A2 is smaller than the groove width W1 of the first area A1. Thus, by making the groove depth D2 of the second area A2 smaller than the groove depth D1 of the first area A1 and making the groove width smaller as described above, the stiffness of the second block portion 62 can be increased, and the second block portion 62 can be prevented from deforming more than the first block portion 61.

Figure 4:
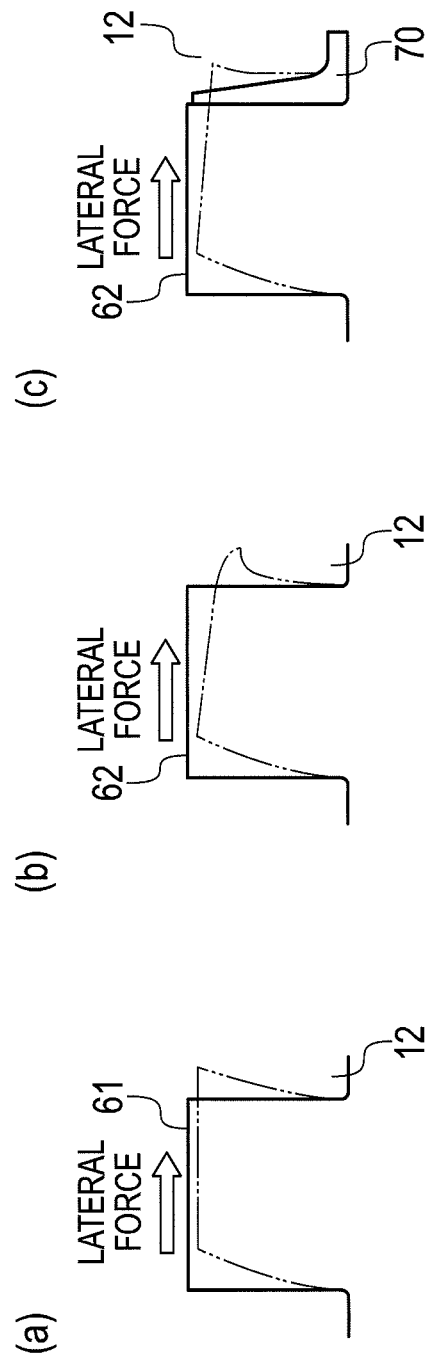
FIG. 4 is a view which schematically shows a modification of a tire a block portion adjacent to an outer circumferential groove.

In particular, a detailed description will be given based on the schematic sectional view shown in FIG. 4. FIG. 4 schematically shows a modification of a tire at the time of critical corning. FIG. 4(a) schematically shows the first block portion 61. FIG. 4(b) and FIG. 4(c) schematically show the second block portion 62. FIG. 4(b) shows a modification assuming that a raised portion 70 is not provided. FIG. 4(c) shows a modification when the raised portion 70 shown in the embodiment is provided.

When a strong lateral force is applied at critical cornering, etc., a wall surface of the outer second block 42 adjacent to the outer circumferential groove 12 collapses into the outer circumferential groove 12. At this time, if the groove depth of the outer circumferential groove 12 is constant over an entire area of the outer circumferential groove 12, the amount of deformation of the second block portion 62 toward the outer circumferential groove 12 increases, as shown in FIG. 4(a) and (b).

On the other hand, as shown in FIG. 4(c), by providing the raised portion 70 in the second area A2 adjacent to the second block portion 62, the stiffness against a lateral input during critical cornering increases, and deformation toward the outer circumferential groove 12 can be suppressed. Therefore, it is possible to suppress a decrease in the driving stability due to the deformation of the second block portion 62.

Next, in order to further clarify the effect of the present invention, an explanation will be given of the comparative evaluation performed for the tires according to the following comparative example and the embodiment. In particular, an explanation will be given of (1) Evaluation method and (2) Evaluation results. The present invention is not to be restricted by these examples.

(1) Evaluation Method

Driving stability on a dry road surface was evaluated by using tires according to the comparative example and the embodiment. The data on the tires used for the comparative evaluation are as follows.

Tire size: 225/45R17

Rim size: 7.5J×17

Internal pressure condition: Vehicle specified pressure

Load condition: Equivalent to two persons

A tire according to the embodiment comprises a raised portion in an outer circumferential groove adjacent to a second block portion. A tire according to the comparative example is configured to have the same groove depth over an entire area of an outer circumferential groove, and is not provided with a raised portion. The tires according to the embodiment and the comparative example differ only in the configuration of the outer circumferential groove, and are the same in the other configurations.

(1.1) Performance Evaluation of the Driving Stability on a Dry Road Surface

A vehicle fitted with each tire was driven, and feeling evaluation of driving stability was performed. The evaluation results are shown in the form of comparative evaluation using the evaluation results of the tire according to the comparative example as a benchmark.

(2) Evaluation Results

The evaluation results using the tires according to the above-mentioned comparative example and embodiment will be explained with reference to Table 1.

TABLE 1

| | Comparative Example | Embodiment |
|---|---|---|
| Performance Evaluation of the Driving Stability | standard | good |

As shown in Table 1, the driving stability of the tire according to the embodiment has been improved with respect to the tire according to the comparative example.

According to the tire according to the embodiment, the stiffness of the tread portion in an outer mounting area is improved by an asymmetric tread pattern in which a land portion located at an outer side of a vehicle when mounting is made larger than a land portion located at an inner side of a vehicle. As the stiffness against a lateral input when cornering, etc. is improved, deformation toward the outer circumferential groove can be suppressed. As a result, partial wear can be suppressed. Further, provision of the first transverse groove and second transverse groove communicating with the circumferential groove ensures draining, and maintains drainage.

Further, as a raised portion is formed in the outer circumferential groove adjacent to the second block portion that is one block divided by the second transverse groove, the stiffness of the second block portion is improved. As a result, a decrease in the driving stability caused by the second block portion collapsing into the circumferential groove can be suppressed.

Further, as the groove depth of the circumferential groove is 60% to 90% of the groove depth of the first area over the entire second area, the stiffness of the second block portion can be effectively improved over an entire area of the circumferential groove, the second block portion can be prevented from deforming more than the first block portion, and the driving stability can be more effectively improved. A smaller depth of the circumferential groove can improve the driving stability (particularly, critical performance). However, the driving stability and hydroplaning performance are in a trade-off relationship. In the embodiment, if the groove depth of the second area is set to smaller than 60% of the groove depth of the first area, the hydroplaning performance of the entire tread pattern decreases, and the groove depth of the second area is desirably 60% or higher of the groove depth of the first area. By setting the groove depth of the second area to 90% or smaller of the groove depth of the first area, the groove bottom of the second area is located outside of the groove bottom of the first area in the tire radial direction, and the stiffness of the second block portion is improved. As a result, the driving stability can be improved.

In addition, as the outer second first transverse groove and outer shoulder first transverse groove are continuously disposed, drainage by the transverse groove can be improved.

The contents of the present invention have been disclosed hereinbefore through the embodiments of the invention. It is noted that the description and the drawings constituting a part of the disclosure are not to be understood as limiting the present invention.

For example, although a raised portion is formed over the entire outer circumferential groove adjacent to the second block portion in the tire 1 according to the embodiment, the configuration is not restrictive. A raised portion may be formed in at least a part of the outer circumferential groove adjacent to the second block portion.

Figure 5:
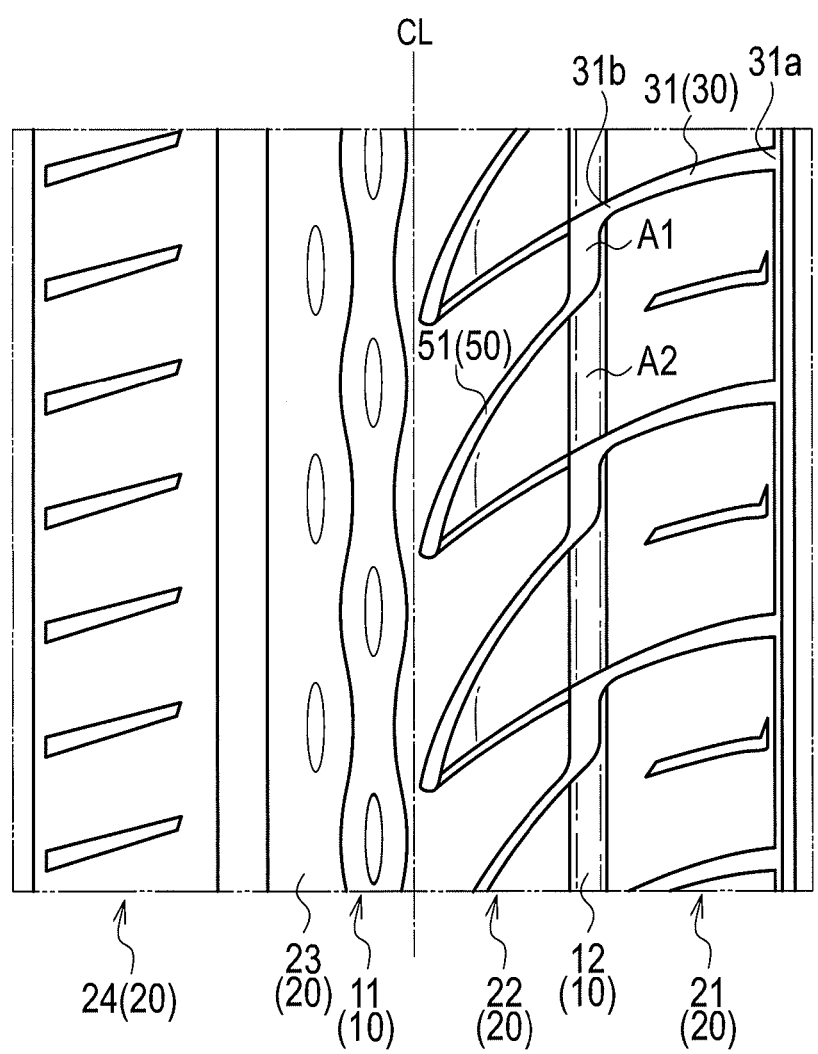
FIG. 5 is a development view of a tread pattern provided on a tread portion of a tire according to another embodiment.

Further, although an outer end of the shoulder transverse groove 31 in a tread width direction is located inside of the outer shoulder rib 21 in the tire 1 according to the embodiment, the configuration is not restrictive. As shown in FIG. 5, an outer end 31a of the shoulder transverse groove 31 in a tread width direction may open to outside of the tread portion 2 in a tread width direction. An inner end 31b of the shoulder transverse groove 31 in a tread width direction opens to the outer circumferential groove 12. Thus, water flowing into the outer circumferential groove 12 enters the shoulder transverse groove 31, and is drained through the outer end 31a of the shoulder transverse groove 31, and drainage can be more improved.

As described above, it is of course that the present invention includes various embodiments and the like not described herein. Therefore, the scope of the present invention is to be defined only by the inventive specific matter according to the adequate claims from the above description.

Note that the entire contents of the Japanese Patent Application No. 2011-31664 (filed on Feb. 17, 2011) and the Japanese Patent Application No. 2011-128279 (filed on Jun. 8, 2011) are incorporated herein by reference.

INDUSTRIAL APPLICABILITY

According to the tire of the present invention, it is possible to increase the stiffness of the second block portion 62 of which the length contacting to the circumferential groove is comparatively long and the area is comparatively small, of the block portions divided into several areas by transverse grooves, in the land portion located at the outer mounting area to which a strong lateral force is applied when cornering. Therefore, the amount of deformation when cornering can be suppressed. Moreover, as a plurality of transverse grooves are formed in the land portion, drainage can be ensured.

The invention claimed is:
1. A tire comprising:
a tread portion which comprises a ground contact surface to contact a road surface, and an asymmetric pattern around a tire equator line;
a circumferential groove which is formed in the tread portion, and extends in a tire circumferential direction;
a land portion which is divided by the circumferential groove, and extends in the tire circumferential direction; and
a plurality of transverse grooves which are formed in the land portion, communicate with the circumferential groove, and extend in a tread width direction, wherein
the circumferential groove is located in an outer area that is an area outside of the tire equator line in a state that the tire is mounted on a vehicle,
the transverse grooves comprise a first transverse groove that divides the land portion into several blocks, and a second transverse groove that divides a block divided by the first transverse groove into a first block portion and a second block portion,
an area of a ground contact surface of the first block portion is configured to be larger than an area of a ground contact surface of the second block portion,
the circumferential groove comprises a first area contacting the first block portion, and a second area contacting the second block portion,
in a length of the circumferential groove in a tire circumferential direction, a length of the second area is configured to be larger than a length of the first area, a groove depth from a ground contact surface to a groove bottom surface of the circumferential groove varies along a tire circumferential direction, a groove depth of at least a part of the second area is smaller than the groove depth of the first area, a groove depth of at least the part of the second area is greater than 70% and 90% or less of a groove depth of the first area, and a groove width of the second area is smaller than a groove width of the first area.

2. The tire according to claim 1, wherein a groove depth of the circumferential groove is 60% to 90% of a groove depth of the first area over an entire area of the second area.

3. The tire according to claim 1, wherein:

a shoulder land portion constituting a shoulder portion is provided outside the circumferential groove in a tread width direction, a shoulder transverse groove extending in a tread width direction is formed in the shoulder land portion, and the transverse groove and the shoulder transverse groove are continuously disposed via the circumferential groove on the ground contact surface.

4. The tire according to claim 3, wherein:

an inner end of the shoulder transverse groove in a tread width direction opens to the circumferential groove, and an outer end of the shoulder transverse groove in a tread width direction opens to outside of a tread portion in a tread width direction.

* * * * *